May 25, 1937.        J. V. MARTIN         2,081,437
AIRCRAFT
Filed Aug. 30, 1933          4 Sheets-Sheet 3
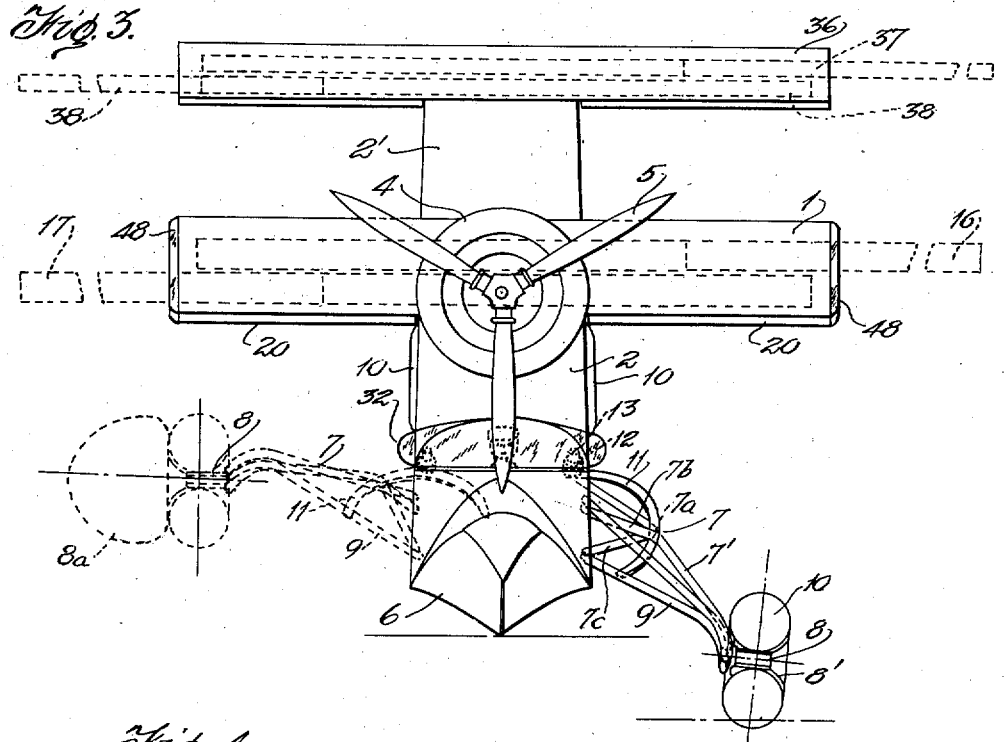
Fig. 3.
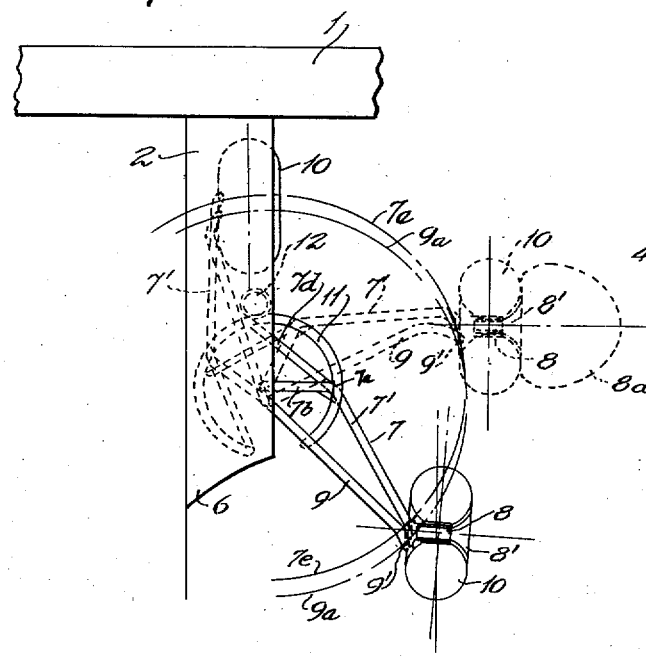
Fig. 4.          Fig. 5.
Fig. 6.
INVENTOR
James V. Martin

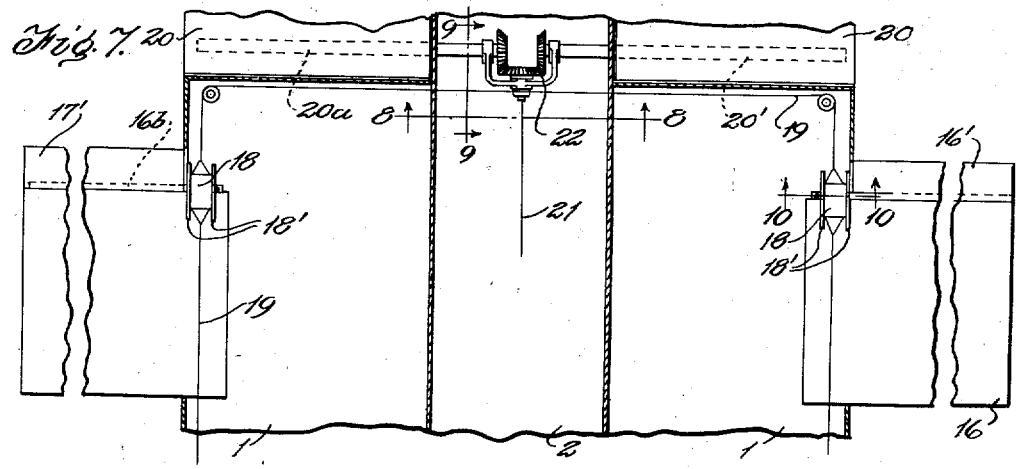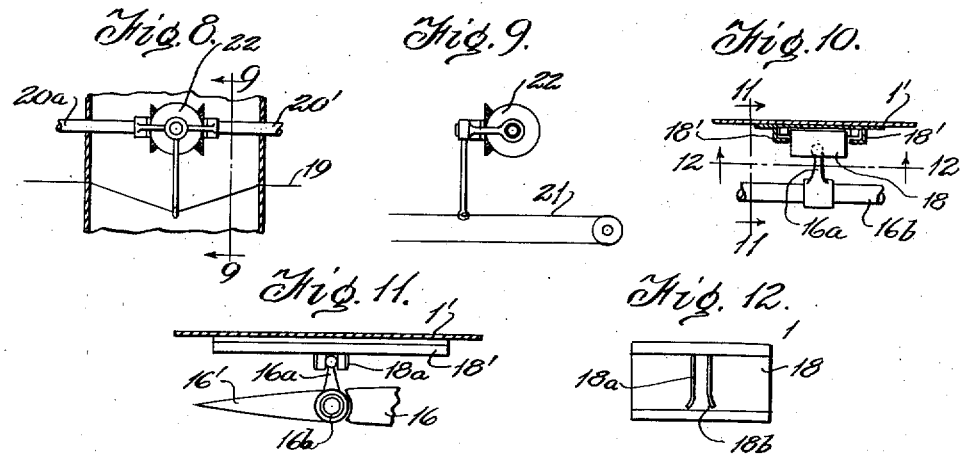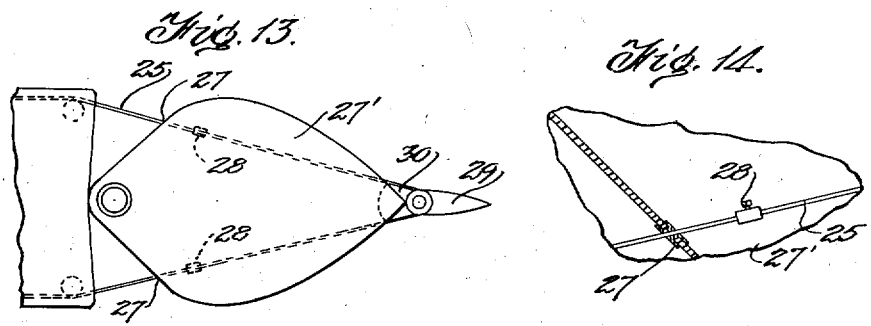

Patented May 25, 1937

2,081,437

UNITED STATES PATENT OFFICE 2,081,437

AIRCRAFT

James V. Martin, Garden City, N. Y.

Application August 30, 1933, Serial No. 687,540

8 Claims. (Cl. 244—13)

The primary object of my invention is to improve the speed range of aeroplanes, i. e. to secure lower landing speeds together with higher top speeds.

A further object is to dispose the wing area in a more compact relationship with the body and in so doing not only avoid detrimental interferences, but to actually secure beneficial interferences.

A further object of my invention is to improve the disclosures of my Patents No. 1,627,191 filed March 5th, 1921; No. 1,854,706 filed Dec. 7th, 1922, and my co-pending applications Serial No. 294,466 filed May 3rd, 1919; No. 396,488 filed Oct. 1, 1929 and No. 674,566 filed June 6th, 1933.

There has been a recognized need for altering the airflow about sustaining aerofoils in flight so as the better to adapt them for very high speeds on the one hand and for very low landing speeds on the other, and a well developed art shows substantial progress toward the goal, particularly the disclosures of A. S. Heinrich, No. 1,558,089 and the work of C. A. Wragg, aided by the eminent scientist Prof. Louis Crook, Nos. 1,779,026 and 1,684,567 as well as that of Dec. 26, 1916, No. 1,209,923. However, I find much of a practical nature left out of the above disclosures, such for example as methods for efficient lateral control for telescopic wing planes and dependable means for attaining positive longitudinal control in compound wing arrangements.

Furthermore the need for a more compact and at the same time more efficient relationship between the compound wings, has not, in my opinion been met to such an extent as to justify actual construction in aeroplanes, unless supplemented and amplified by further invention.

With these and further objects in view I shall proceed to the description of the drawings:

Fig. 3 is a front elevation of my amphibian multiplane, and

Fig. 4 is a view taken along the line 4—4 of Fig. 1, showing three different positions for my combined retractable chassis and balancing float.

Fig. 5 is a plan view of one of my extending or telescopic wings showing fixed slots to increase the lifting ability of the wing for alighting and, Fig. 6 is an end elevational view of the wing shown in Fig. 5.

Fig. 7 is a diagrammatic plan view for the purpose of illustrating the best mode of operation for the plane's lateral controls.

Fig. 8 is an enlarged view partly in section taken in front elevation as indicated by the arrows 8—8 of Fig. 7.

Fig. 9 is a side elevational view taken as indicated by the arrows 9—9 in Fig. 7.

Fig. 10 is a view taken partly in section as indicated by the arrows 10—10 of Fig. 7.

Fig. 11 is a view taken as indicated by the arrows 11—11 of Fig. 10 and showing my aileron operating and disengaging means.

Fig. 12 is a view of the aileron engaging track as viewed from below as indicated by the arrows 12—12 of Fig. 10.

Fig. 13 is an enlarged plan view of the rear rudder of my amphibian, and Fig. 14 is a diagrammatic view showing the interior of the said rudder and the stop on the rudder control wires.

Fig. 15 is an enlarged view of the auxiliary wing bracket 23.

Proceeding now, to the more detailed description of my invention, like numerals will refer to similar parts throughout the several views.

Figure 1:
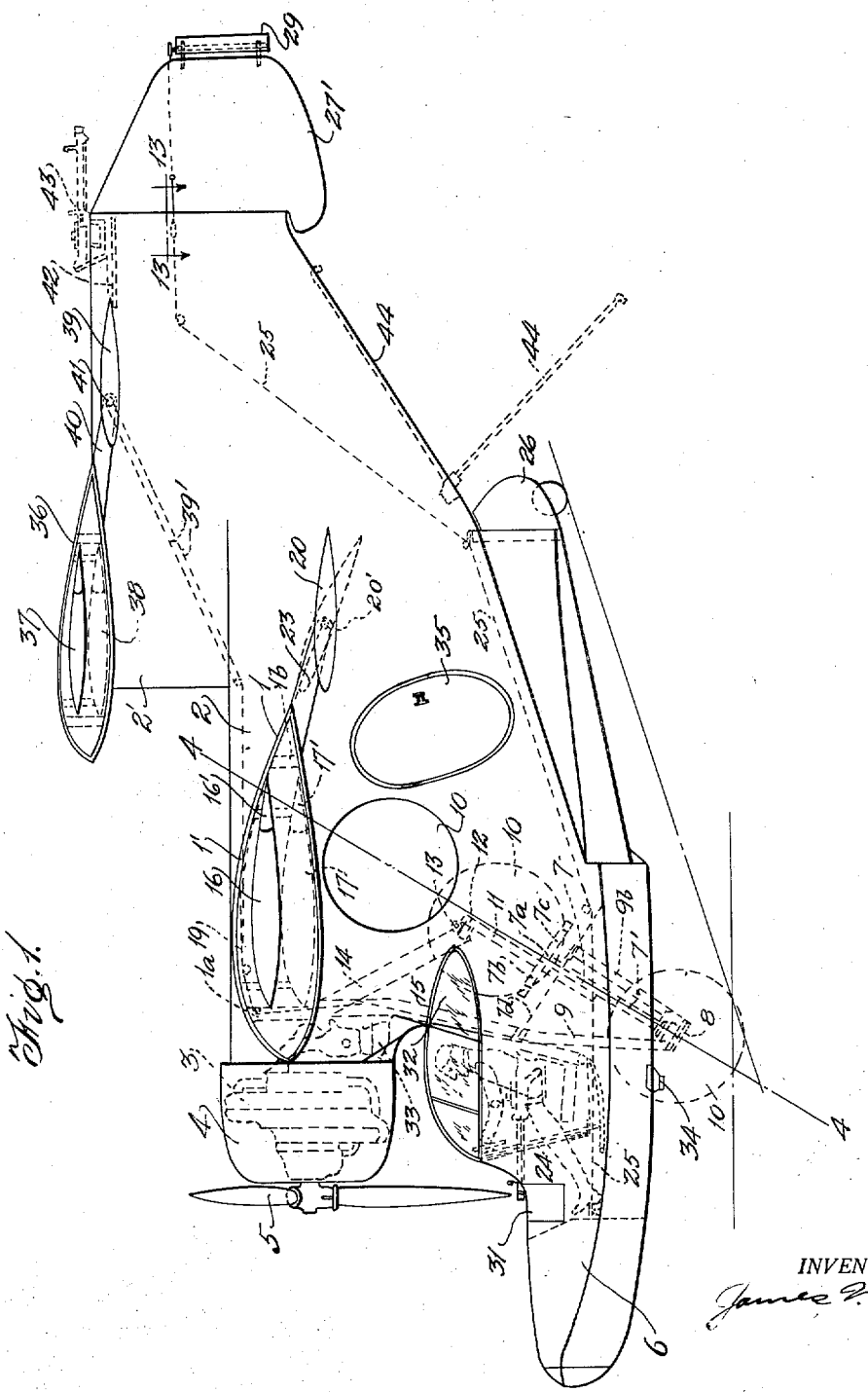
Fig. 1 is a side elevation of an aeroplane or amphibian exemplifying the modifications due to my invention.

1 indicates the main or principal lifting wing of an aeroplane, extending for strength through the aeroplane body or fuselage 2, in the front of which is shown a two row radial aircooled motor 3 inclosed within a ring cowling 4.

A three bladed propeller 5 is driven by the aforesaid motor and below the said propeller and motor is a hydroplane boat 6 which blends rearwardly and upwardly into the fuselage 2.

A retractable chassis 7 supports the entire forward portion of the amphibian on the ground and furnishes a balancing float therefor on the water, when retracted to an intermediate position as shown in dotted lines on starboard side of amphibian in Figure 3 and in dotted lines on port side in Fig. 4. The chassis consists of the frame 7' which leads upwardly from the wheel hub 8 to a junction 7a with two braces 7b and 7c attached to the body 2 along the axis 7d.

A forward strut 9 is also journalled on body at axis 7d and connects at its lower end to a journal 9' on the extension plate of the hub 8. The arc of the circle marked 9a in Fig. 4 indicates the upward path of the attachment 9' while the corresponding attachment of the brace 7' describes the arc 7e and it will be observed that by desirable placement of the different axes the wheel 10 can be made to assume any desirable angle to the ground, to the water and to the fuselage housing which almost completely houses it in its upmost position far above the water line. The arc 11 is constructed as a rack, as indicated in Fig. 30 of my copending Serial No. 674,566 and is moved by a toothed pinion 12, like that of Fig. 31 of the aforesaid serial and is motivated by the worm-gear 13 similar to Fig. 32 of Serial No. 674,566 and that in turn is driven by a storage transmission motor like that disclosed in my Patent No. 1,854,706 by means of a flexible shaft as shown in the aforesaid Serial No. 674,566. Suitable internal braces 14 and 15 carry the principal weights as of the motor and the main wing front spar to the points of attachment of the body to the journalled chassis frame members, see Fig. 1.

The wheel 10 has a very wide hub 8 which flares at 8' so as to provide a housing for a flexible bag 8a, similar to that inflatable bag shown in Figs. 5 and 6 of my co-pending Serial No. 396,488 and it serves the same purpose being of a somewhat improved shape and is inflated as described in above serial. The worm gear 13 is irreversible so that it firmly holds the chassis or balancing float in any given position and it is contemplated that the motor for storing power from the aeroplane motor, will have an intermediary stop position for the operating lever shown in my patent above referred to.

The main wing 1 is of double convex form and given strength through its composite skin 1' as more completely disclosed in Fig. 17 of Serial No. 674,566; a forward spar 1a and a rearward spar 1b leave space between them for two smaller telescopic wings 16 and 17 carried by tracks and operated like those illustrated in Fig. 11 of the aforesaid serial. Each telescopic wing carries an aileron, as for example 16' and 17' and these are operated by an engaging carriage 18 Figs. 10, 11 and 12. This carriage slides fore and aft in tracks 18' fixed to the under side of the upper wings' surface 1', Fig. 10, and the carriage has a channel 18a flanged outwardly at 18b to easily engage aileron lever 16a rigid with aileron torque tube 16b: It will thus be seen that when the wing 16 is extended near its fully extended position as more completely shown in my co-pending Serial No. 674,566, the aileron lever 16a will engage the wide opening 18b and be held for movement as controlled by the aileron wires 19 which lead over various sheaves from the operator's position as indicated in my Serial No. 674,566; these aileron wires also lead, as indicated in Fig. 7 to a differential operating means for an auxiliary wing 20 carried operatively on torque shafts 20' and 20a to operate the auxiliary wing differentially for lateral stability and jointly these two sections of auxiliary wing are operated by another set of wires 21, Fig. 9 and these in turn are held in any desired position by a hand lever convenient to the pilot as for example that shown in Fig. 18 of Serial 674,566 and indicated as 36. The differential gears 22 are of obvious function as also illustrated in the aforesaid Serial 674,566. The auxiliary wing 20 is supported by the torque tube in the fuselage as shown in Fig. 7 and its outer support is a bracket 23 leading from a firm attachment to the rear spar 1b of the main wing 1 to the bearing 20a in the end thereof. A slot in the forward part of the wing 20 permits wing movement about the bracket 23, this bracket 23 has an antifriction bearing 20a as are all of the journalled controls, so equipped.

The pilot's position is unique in that he has the best possible vision in the most important directions, i. e., down and forward the control column 24 has a wheel mounted thereon in a form now common and the aileron wires lead off that near the column pivot as at 18' in Fig. 18 of Serial No. 674,566, thence to the carriage 18 shown in this case. The rudder control is also an improvement over anything heretofore known as it requires only a fraction of the usual effort and creates a stronger turning moment. The rudder control wires 25 lead from the foot bar of the pilot to a ground and water rudder 26 thence through proper leads and out of the rear of the fuselage and into holes 27 in the rear rudder 27': This rudder 27' is of a very effective shape as proved in wind tunnel tests, but to add further to its efficiency I have placed a smaller auxiliary aerofoil 29 journalled to rearward on brackets 30.

Stops 28 Figs. 13 and 14, allow the control wires, when first actuated, to move only the smaller rear aerofoil, but this affects the airflow of the larger rudder to create a powerful turning moment and only when very violent turning is needed will it be necessary to pull a control wire until the stop 28 engages with the restricted hole 27 and thus turn the larger rudder.

A protective plate 31 will prevent the feet of the pilot from being injured in case of propeller breakage and a machine gun is shown on the right side of the pilot and the transparent material for his vision is carried in streamline form over and beyond the side of the body as at 32 so the pilot, without discomfort may see aft. An oil drain 33 carries oil from the motor aft of the pilot's eye position. A device for catapulting 34 is attached to the boat bottom and a door 35 is provided convenient for both pilot and gunner: The transparent panel immediately abreast of the pilot's head slides over from port to starboard so that he may exit through that. In respect to the subject matter of the transparent bulge 32 and to the differential action, for lateral control, of the auxiliary wings 20, see Figs. 1 and 2, I make reference to my co-pending application Serial No. 136,190 filed April 10, 1937 for Oceanplanes.

In order to provide a compact type of aeroplane with great lifting ability I have invented a means of combining short span and superloading the main aerofoil by juxtaposing other aerofoils to rearward and above and below the same, so that the aerofoil 36 combines with 20 in increasing the lift and reducing the drag of the main plane. The aerofoil 36 also contains telescopic aerofoils 37 and 38 and is held securely attached to an upward and rearward projection 2' of the fuselage 2. There is also a rearwardly disposed aerofoil 39 held by brackets 40, similar to bracket 23 hereinbefore described. The longitudinal control of the aeroplane is obtained by this well balanced control aerofoil 39 by means of a simple set of wires 39' from the bottom of the control column leading to and around the torque tube 41, see Fig. 18 of Serial #674,566.

Figure 2:
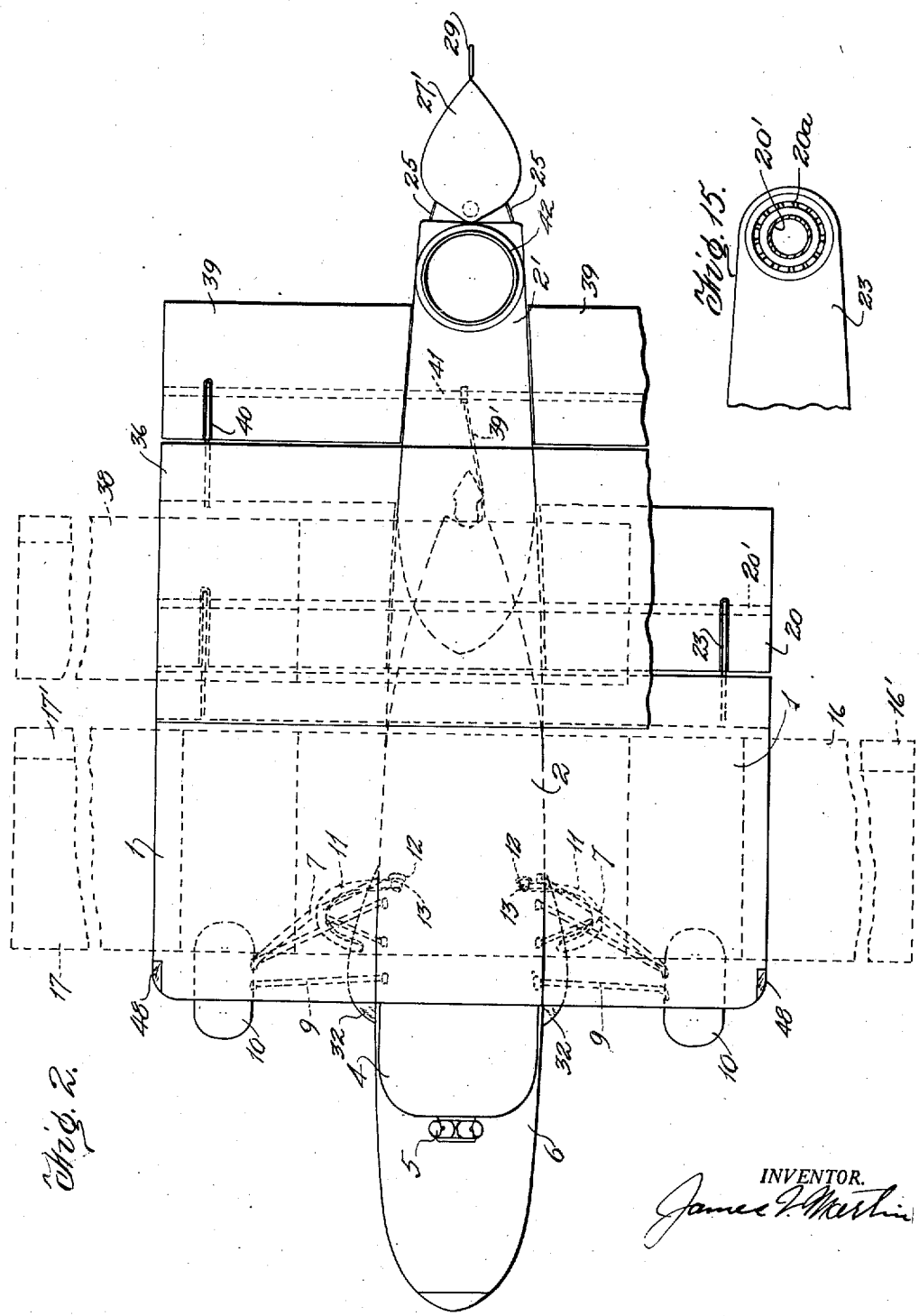
Fig. 2 is a plan view looking down upon the top of my amphibian.

The rear gunner, has an unrestricted field of rearward fire from the rearly demountable gun scarf 42; the gun 43, shown in dotted lines, Fig. 1, because retractable, may be fired in practically every rearward direction without interference from the rear aeroplane controls.

Of course the propeller and motor unit shown may be duplicated forward of aerofoil 36, and hook 44 is for deck landing.

Fig. 5 shows the special means I employ to prevent burbling of the airflow at high incidence or attack angles. The slots 44 and 45 will allow the lift of the wing to increase at high angles, and while these slots are injurious to flight at low angles of attack, they will not cause increased drag in the plane I disclose because at low attack angles and high speed, these wings are retracted.

I also show near the extensible wing's ends a slot 46 leading from underneath the wing forwardly toward the upper wing surface, and I also show 47 a sliding door closure for this slot, the sliding door slot operable after the means shown in my Patent No. 1,771,053 to open or close the slots, from the pilot's compartment, permits alternate use of these slots either in conjunction with the ailerons 16' or separately: The rush of air through from the bottom of the wing through slot 46 causes a disturbance instantly lowering the lift on the wing, so that this means may be employed to cause roll of the aeroplane for lateral stability and is an improvement over my showing of this sort of air slot in my Patent No. 1,854,706, see Figs. 1, 27. 48 shows the transparent wing end housing for the navigation light.

In operation from the land the chassis will be fully extended by a chassis power storage motor such as shown in the patent above referred to; the aerofoil 20 will be placed in the dotted line position to give great lift at low speeds, by use of wires 21 and the wings 16, 17, 37 and 38 will be fully extended by their own servo motor as disclosed in my co-pending application Serial No. 674,566, since all these wings have the slots 44 and 45 their lift at large angles and slow speeds will be great and the plane will easily lift from the ground, or from the water, if the chassis be moved to the intermediate position shown in Figs. 1, 3 and 4. After climbing to desired altitude the wings 16, 17, 37 and 38 will be retracted, greatly strengthening the main wings and the wing 20 will be returned to its full line position which allows it to reduce the drag of the thick wing ahead of it while the chassis can be, either simultaneously, with the wings, or independently of them, retracted from its laterally extended positions. The wing 39 can be used as the longitudinal control or to function like 20 or for both purposes. To climb it may be advisable to leave the wings partially extended; but to alight on the water the pilot should operate the servo motor which extends the wings and at the same time the servo motor for extending the floats outwardly laterally in order to compensate in balance leverage for the extending wings: For this reason I have shown a laterally extending type of retractable chassis as preferable to those disclosed in my former patents and for the additional reason that the space occupied by such alighting gears or floats is now required for the telescopic wings and their tracks.

As a result of my novel combination of retracting wings and laterally retracting chassis floats together with the very novel positions of motor and pilot cabin forward of the above respectively and placing the pilot's cabin under the motor I am able to accomplish results long sought by the world aviation industry, particularly in the type of deck-landing craft desired for naval carrier ships I am able readily after landing, to diminish for storage below decks, the lateral size of an aeroplane and the device of bringing motor and pilot both closer to the center of gravity has the effect of shortening the plane fore and aft. The devices may be widely adapted without departure from the teachings.

What I claim as new is:—

1. In combination with an aeroplane main wing provided with smaller wings having portions retractable into overlapping positions within said main wing and internal wing trussing inadequate for the maximum speed flight stresses of the said main wing, guideways carried by the said trussing and located above, between and below the said overlapping wings, the said smaller wings overlapping when fully retracted in the region of the greatest wing stress of the said main wing at the maximum speed of the said aeroplane and acting in conjunction with the said guideways to provide the additional wing strength required at maximum flight speed, an auxiliary wing attached to and spaced apart rearwardly from the said main wing and adapted by alterations of its attack angle to produce maximum lifting conditions for the said aeroplane, the said smaller wings in their extended positions varying the airflow over the outer portions of the said auxiliary wing and abetting the said lifting conditions.

2. An aeroplane main wing including telescopic wings retractable therewithin to lower the drag of the said aeroplane and an auxiliary wing attached by a bracket to and spaced apart rearwardly and downwardly from the said main wing and having an adjusted position to lower the drag thereof and a different adjusted position to compound the lifting airflow adjacent the lateral ends of the said main wing when the said telescopic wings are in their extended positions and such positions varying the airflow over the outer portions of the said main wing and its said auxiliary.

3. In combination with the main wing of an aeroplane, high lift devices including telescopic wings having transversely arranged slots from their under to their upper surfaces and said wings extensible from the lateral ends of the said main wing, an auxiliary wing spaced rearwardly from the said main wing so as to provide a slot for airflow therebetween and held in adjustable positions by means of a bracket leading from the rear spar of the said main wing, means available to the pilot to rotate the said auxiliary wing to increase or diminish the size of the said intervening slot to vary the airflow therethrough in conjunction with the variation of airflow produced over the end region of the said main wing and its auxiliary by the said telescopic wings in their extended positions.

4. In an aeroplane having a principal body frame the combination of a wing, motor and pilot's cabin, grouped compactly in side elevation about the principal body frame, the said body providing a chassis housing adjacently below the said wing and to rearward of the said cabin, the said body subtended from the said wing and carrying the said motor and wing adjacent the upper part of the said frame, a retractable wheeled chassis journaled to the said body adjacent the lower end of the said frame upon an axis having its forward end upwardly inclined so that in its most extended position the chassis wheels occupy a position below and forwardly of the said axis and in its retracted position the wheels are located in the aforesaid housing and above the said axis.

5. A hydroaeroplane comprising a comparatively thick monoplane wing including its adequate trussing and smaller wings housed therein, the said wings laterally extensible from within the ends of the said thick wing and requiring additional lateral support for the said hydroaeroplane on the surface of the water when the said wings are in their extended positions, a body for the said hydroaeroplane subtended from the under side of the said thick wing and adapted to float on the surface of the water, balancing floats carried by and spaced from said body, struts laterally spacing said floats from said body, housing means formed within the side walls of the said body at a position above the water line at least equal to the vertical dimension of each said float and means including the said struts to retract the said floats and house the same within the said housings.

6. An aeroplane having a motor, a main wing housing overlapping telescopic wings therewithin, a pilot's cabin under the motor, the main wing adjacently behind the said motor, a retractable chassis, and housing means adjacently below the said wing for receiving said chassis when retracted whereby the craft is rendered compact for maneuvers and storage.

7. In combination with a main wing, a wing adapted to telescope therewithin, an aileron pivoted on said telescopic wing, internal wing trusses spacing said telescopic wing apart from the inside of the main wing covering, a pilot's aileron control leading from the pilot's cabin to a position adjacent the inside of the lateral end of the said main wing and moving a carriage in fore and aft guides mounted on the inside of the said main wing, means engaged and disengaged with said carriage upon the extension and retraction respectively of the said telescopic wing to connect and disconnect the said aileron operating mechanism and the said carriage and to impart a rocking motion to said aileron about its said pivoted axis.

8. A hydroaeroplane combination including a body subtending from the under side of a main wing and provided with a boat shaped bottom, the said wing housing smaller wings laterally extensible through the ends thereof and in their extended positions requiring for said hydroaeroplane additional balancing moments on the surface of the water, a balancing float spaced laterally apart by struts from the side wall of the said body a distance greater than the width of the said body and retractable by an upward and inward motion into a housing in the said wall of the said body.

JAMES V. MARTIN.